US010044630B2

(12) United States Patent
Kriegesmann et al.

(10) Patent No.: US 10,044,630 B2
(45) Date of Patent: Aug. 7, 2018

(54) SYSTEMS AND/OR METHODS FOR REMOTE APPLICATION INTROSPECTION IN CLOUD-BASED INTEGRATION SCENARIOS

(71) Applicant: Software AG, Darmstadt (DE)

(72) Inventors: Peter Kriegesmann, Mannheim (DE); Bhaskar Reddy Byreddy, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 277 days.

(21) Appl. No.: 14/969,737

(22) Filed: Dec. 15, 2015

(65) Prior Publication Data
US 2017/0171049 A1    Jun. 15, 2017

(51) Int. Cl.
| | |
|---|---|
| G06F 15/173 | (2006.01) |
| H04L 12/911 | (2013.01) |
| H04L 29/08 | (2006.01) |
| H04L 12/26 | (2006.01) |
| H04L 12/24 | (2006.01) |

(52) U.S. Cl.
CPC ......... *H04L 47/70* (2013.01); *H04L 41/5009* (2013.01); *H04L 41/5096* (2013.01); *H04L 43/08* (2013.01); *H04L 43/0876* (2013.01); *H04L 67/1097* (2013.01)

(58) Field of Classification Search
CPC . H04L 43/0876; H04L 43/08; H04L 41/5096; H04L 41/5009; H04L 47/70; H04L 67/1097
See application file for complete search history.

(56) References Cited

U.S. PATENT DOCUMENTS

| | | | | |
|---|---|---|---|---|
| 7,818,729 | B1* | 10/2010 | Plum | G06F 11/3624 717/140 |
| 8,739,137 | B2* | 5/2014 | Siskind | G06F 8/447 717/136 |
| 2005/0246693 | A1* | 11/2005 | Plum | G06F 8/41 717/140 |
| 2006/0130021 | A1* | 6/2006 | Plum | G06F 11/3624 717/140 |

(Continued)

*Primary Examiner* — Richard G Keehn
(74) *Attorney, Agent, or Firm* — Nixon & Vanderhye P.C.

(57) ABSTRACT

Certain example embodiments relate to techniques for debugging and/or introspecting an integration deployed in a distributed computing environment. The integration includes operations performable responsive to receipt of instructions from an orchestrating system by public interfaces of computing systems in the distributed computing environment. The orchestrating system is remote from the computing systems. An inverse operation for at least some of the performable operations in the integration is identified. The inverse operations also are performable responsive to receipt of instructions from the orchestrating system by the public interfaces of the computing systems of the distributed computing environment. Each inverse operation reveals, upon its performance, an effect of one or more associated performable operations. The orchestrating system sends instructions to the public interfaces of the computing systems to cause the performable operations and their associated inverse operations, if any, to be performed in parallel with one another, in the debugging and/or introspection.

32 Claims, 10 Drawing Sheets

(56) References Cited

U.S. PATENT DOCUMENTS

| | | | | |
|---|---|---|---|---|
| 2013/0298192 A1* | 11/2013 | Kumar | ................... | H04L 67/10 |
| | | | | 726/3 |
| 2015/0026667 A1* | 1/2015 | Pruss | ..................... | H04L 41/12 |
| | | | | 717/135 |
| 2016/0127454 A1* | 5/2016 | Maheshwari | ........... | H04L 47/70 |
| | | | | 709/223 |
| 2016/0333416 A1* | 11/2016 | Babiarz | .................. | G06F 19/22 |
| 2017/0026488 A1* | 1/2017 | Hao | ....................... | H04L 67/32 |
| 2017/0097841 A1* | 4/2017 | Chang | .................... | H04L 67/10 |
| 2017/0247739 A1* | 8/2017 | Goluch | ................... | C12Q 1/12 |

* cited by examiner

SYSTEMS AND/OR METHODS FOR REMOTE APPLICATION INTROSPECTION IN CLOUD-BASED INTEGRATION SCENARIOS

TECHNICAL FIELD

Certain example embodiments described herein relate to systems and/or methods for introspection and/or debugging approaches in distributed computing environments (e.g., the cloud). More particularly, certain example embodiments described herein relate to techniques for debugging and/or introspecting applications deployed in a distributed computing environment by defining inverse application programming interface (API) introspection logic that includes inverse API calls that correspond to the API calls in the orchestration logic under test.

BACKGROUND AND SUMMARY

More and more organizations are exposing their technology-based business capabilities to external consumers, business partners, and/or others, through so-called Application Programming Interfaces (APIs). In this regard, APIs generally provide services in a wide range of different technology areas and for a wide variety of different possible end uses. For instance, LinkedIn allows companies to utilize candidates' CVs during their application processes, e.g., by offering the information stored within the LinkedIn platform (and storage locations thereof) through public APIs. As another example, Salesforce.com helps companies manage their entire sales processes, e.g., from lead generation to post-sales relationship management, through APIs and mobile device integration. In still another example, MasterCard offers APIs for bill payment and fraud detection services, as well as for enabling consumers to search for the closest ATM.

It will be appreciated that the advent and proliferation of smart devices, mobile apps, and the like, as well as the broad availability of the Internet, has challenged organizations to make such capabilities accessible from almost any location and at almost any point in time. As a consequence, and as will be appreciated from the three brief examples provided above, organizations oftentimes find themselves offering their formerly internal Information Technology (IT) endpoints to a growing number of external consumers.

In an effort to try to reduce vulnerabilities in local IT systems, some organizations create new applications directly within a distributed computing environment such as, for example, a cloud computing environment. Although there are many competing definitions for "cloud computing," it generally involves (1) the delivery of computing as a service rather than a product, and (2) providing shared processing and/or storage resources, software, information, etc., to computers and other devices as an oftentimes metered service over a network (typically the Internet). In a cloud computing environment, end users do not necessarily need to know the physical location and configuration of the system that delivers the services. Applications typically are delivered to end users as the service, enabling transparent access to the cloud-based resources.

The nature of cloud computing oftentimes makes it easier for consumers to adapt to new applications provided through the cloud, e.g., as compared to newly exposed internal endpoints. The former oftentimes simply involves the creation of a new account by logging on through a web browser or mobile app, whereas the latter oftentimes instead involves re-developing and/or re-deploying software at the consumers' endpoints. The nature of cloud computing also oftentimes facilitates scalability for service providers that manage growing numbers of consumers and/or APIs.

Because many APIs are now exposed in the cloud, integrations that make use of cloud APIs and/or applications themselves sometimes also are moved into the cloud. This approach generally is referred to as "Integration Platform as a Service" (iPaaS) technology. The webMethods Integration Cloud from Software AG is an example iPaaS technology platform.

In a so-called "hybrid integration approach," new APIs, along with existing applications from the backend, are provided or otherwise made available by orchestrating APIs in the cloud. This is shown schematically in FIG. 1. That is, an iPaaS platform 102 includes an orchestrating API 104. The orchestrating API 104 connects with remote APIs 106a-106x, which are respectively provided to cloud applications 108a-108x.

APIs generally are designed in a manner that allows for easy introspection, as many organizations offering APIs for creation and/or modification of data records (as would be the case in, for example, creating a new customer using a Salesforce.com API) typically also expose such APIs for data querying purposes. The rich functionality that can be provided with APIs, combined with their more "permanent" availability (e.g., because they typically remain accessible even though the backend resources with which they interface may change), and comparatively low-barrier restrictions (oftentimes related to security concerns, compliance with Service-Level Agreements (SLAs), payment conditions, and/or the like), offers countless new possibilities for introspection, including remote introspection.

Unfortunately, however, opportunities for introspecting APIs in iPaaS and/or other related technology platforms oftentimes are limited, at least form a practical perspective. Indeed, as explained below, current commercially available products typically encounter difficulties in testing and verifying cloud-based API integrations and orchestrations.

These commercially available products typically fall into one of three different categories. First, cloud-to-cloud orchestration debugging typically is based on conventional debugging concepts but resides on top of cloud APIs (i.e., in an Information Cloud). Tools that involve cloud-to-cloud orchestration based on conventional debugging typically do not offer much new compared to local code debugging (e.g., in contexts relevant to the instant disclosure). For instance, and in contexts relevant to the instant disclosure, because tools that involve cloud-to-cloud orchestration based on conventional debugging are executed on top of cloud APIs, the debugger typically will only see whether an API call was successful (or whether an exception was encountered) while stepping through the individual integration steps.

Second, service-oriented architecture (SOA) visibility tools such as webMethods Insight introspects remote applications directly on the server, utilizing agent technology. The agents are remotely installed and typically are designed for retro-inspection and root cause analysis of exceptions that occurred in the past. Although they allow developers to see the impact of changes in a remote system, such tools generally are not appropriate or sufficient for developers because of the need to deploy agents and limitations concerning post hoc analysis.

Third, service orchestration or business process management may be performed without human interaction and with one or more additional monitoring components enabled. Such solutions typically are intended to be used in asynchronous communication patterns. In addition, for business processes (for example), the service invocation flow typically is designed from a static (e.g., at the point of deployment) point of view, and API calls typically are not calculated based on another step in the process. These features unfortunately make real time analysis difficult, if not impossible.

Other typical products available in the market allow for debugging and data introspection for objects that are under the control of the executing system. In this sense, such products typically show how variables and objects are changing and/or change over time, e.g., while the code is executed, runtime conditions are encountered, etc. However, in most cases, the related tools cannot introspect and/or debug remote data, code, applications, etc., e.g., unless they have agents installed on the relevant remote systems.

Certain example embodiments address the above and/or other concerns. For instance, certain example embodiments help IT organizations in testing and verifying cloud-based API integrations and orchestrations. This may be accomplished by providing some or all of the following and/or other features: (1) automatic or at least semi-automatic identification and provisioning of "inverse" APIs for one or more selected APIs (e.g., based on manual selection, static lists, computed or "social" intelligence, etc.); (2) integrated (e.g., side-by-side or otherwise oriented) introspection views based on the real-time invocation of inverse APIs; (3) selection of a subset of relevant inverse APIs, e.g., in the case of complex orchestrations, so as to help reduce the likelihood of developers, testers, and/or others from becoming flooded with too much information; and (4) provisioning of these and/or other features without remotely deployed agents, e.g., such that remote systems need not be "touched" or accessed other than via public APIs. It follows from the above that because it is possible that more than one inverse API may be selected, inverse APIs in certain example embodiments may not be exposed by the same system or vendor as the API in order to be called. Furthermore, in certain example embodiments, because debugging and/or application introspection typically are performed in real-time, the inverse API also may be executed in parallel and provide results in real-time.

One aspect of certain example embodiments relates to helping API orchestration developers, testers, and/or others easily introspect remote applications exposed through public APIs. It will be appreciated that introspection may relate to, among other things, querying the API of the same or another party in order to verify immediate and/or indirect impact(s) on a cloud application that has been directly and/or indirectly invoked through an API call, e.g., when creating or updating data.

Another aspect of certain example embodiments relates to techniques for debugging cloud APIs in a non-invasive manner, e.g., without the need for static debugging code being deployed and avoiding the overhead associated with such an approach.

Another aspect of certain example embodiments relates to the deployment of inverse APIs to allow inspection of applications through their APIs, e.g., in a cloud integration or other distributed computing environment.

Certain example embodiments address the technical problem of how to test and/or otherwise introspect applications (or aspects thereof) deployed in a distributed computing environment (such as, for example, a cloud computing environment) where one does not have full control over the system under test. For example, various cloud providers and companies that distribute applications have a wide variety of associated APIs, and certain example embodiments help address the issue of how to test the results of calling these APIs in a non-invasive manner (e.g., without specific static debugging code being included directly in the remote systems under test). More particularly, certain example embodiments include the deployment of reverse APIs that allow remote application introspection to be performed so that, for example, the effects of calling an API in the cloud can be seen through the calling of a corresponding inverse API that is supported and provided by the application in question. This approach can in some implementations advantageously provide more than the mere changes to a given variable that results from an API call, and instead can provide information concerning a whole set of changes, e.g., based on the change to the variable and its consequences, without the need for static invasive debugging code and without the overhead implied by such code.

In certain example embodiments, a distributed computing system is provided. The system includes a plurality of first computing platforms, with each said first computing platform comprising an interface and first processing resources including at least one first processor and a first memory, and with the first processing resources of the respective first computing platforms being configured to perform operations in response to instructions received over the respective interfaces. The system also includes an integration and introspection computing platform comprising second processing resources including at least one second processor and a second memory, with the integration and introspection computing platform being located remote from the first computing platforms. The second processing resources are configured to control the integration and introspection computing platform to at least: send first instructions to the first computing platforms to cause the first computing platforms to perform first operations in accordance with orchestration logic; send second instructions to the first computing platforms to cause the first computing platforms to perform second operations in accordance with introspection logic, the second operations being defined as inverse operations of at least some of the first operations; receive from the first computing platforms results from the performance of the second operations; and correlate the received results and the corresponding first operations.

Corresponding methods and non-transitory computer readable storage mediums tangibly storing instructions for performing such methods also are provided by certain example embodiments, as are corresponding computer programs.

In certain example embodiments, there is provided a method of debugging and/or introspecting an integration deployed in a distributed computing environment. The integration is defined to include a plurality of operations performable responsive to receipt of instructions from an orchestrating system by public interfaces of computing systems of the distributed computing environment. The orchestrating system is located remote from the computing systems. An inverse operation for at least some of the performable operations in the integration is identified. The inverse operations also are performable responsive to receipt of instructions from the orchestrating system by the public interfaces of the computing systems of the distributed computing environment. Each inverse operation is structured to reveal, upon its performance, an effect of one or more associated performable operations. The orchestrating system is able or otherwise configured to send instructions to the public interfaces of the computing systems to cause the performable operations and their associated inverse operations, if any, to be performed in parallel with one another via processing resources of the computing systems, in debugging and/or introspecting the integration.

Corresponding systems and non-transitory computer readable storage mediums tangibly storing instructions for performing such methods also are provided by certain example embodiments, as are corresponding computer programs.

In certain example embodiments, there is provided an orchestrating system for debugging and/or introspecting an integration deployed in a distributed computing environment. The integration is defined to include a plurality of operations performable responsive to receipt of instructions from the orchestrating system by public interfaces of computing systems of the distributed computing environment. The orchestrating system is located remote from the computing systems. The orchestrating system comprises processing resources including at least one processor and a memory, the processing resources being configured to control the orchestrating system to at least: control the computing systems to perform the integration; facilitate identification of an inverse operation for at least some of the performable operations in the integration, the inverse operations also being performable responsive to receipt of instructions from the orchestrating system by the public interfaces of the computing systems of the distributed computing environment, each inverse operation being structured to reveal, upon its performance, an effect of one or more associated performable operations; and (a) send instructions to the public interfaces of the computing systems to cause the performable operations and their associated inverse operations, if any, to be performed in parallel with one another via processing resources of the computing systems, and (b) receive results from the performance of the inverse operations from the public interfaces of the computing systems, in debugging and/or introspecting the integration.

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Cloud-based integrations typically rely on the availability of services that offer public application programming interfaces (APIs) in order to write, read data, change the state of objects, and/or perform other actions, in remote applications. It will be appreciated from the description above that it oftentimes is difficult to introspect and/or debug backend applications in these and/or other related distributed computing environments.

Certain example embodiments therefore provide for remote application introspection in cloud-based integration and/or other related scenarios. More particularly, certain example embodiments introduce a debugging and/or introspection pattern on top of Integration Platform as a Service (iPaaS) solutions (such as, for example, Software AG's webMethods Integration Cloud), which advantageously allows for real-time introspection across multiple cloud applications.

The techniques of certain example embodiments may be better understood in connection with the following concrete API orchestration example. Of course, it will be appreciated that the following is only one API orchestration example, and the techniques set forth herein have a broad application across a variety of different API orchestrations in the same or similar distributed computing environments, e.g., where one or more cloud applications and/or one or more backend on-premises applications may be provided and used in connection with an integration.

In this example, the overall new service provided by the orchestration may be thought of as being appropriate for repairing a defect machine that has an active warranty. From a consumer perspective, this service is to be invoked together with machine details, an error description, and a customer ID. However, this example also involves the calling of several APIs "behind the scenes" or, in other words, without needing direct knowledge and/or control from the consumer. In this regard, FIG. 2 is a schematic view of a cloud-to-cloud and hybrid integration in accordance with a concrete example used to demonstrate exemplary features of certain example embodiments.

Figure 1:
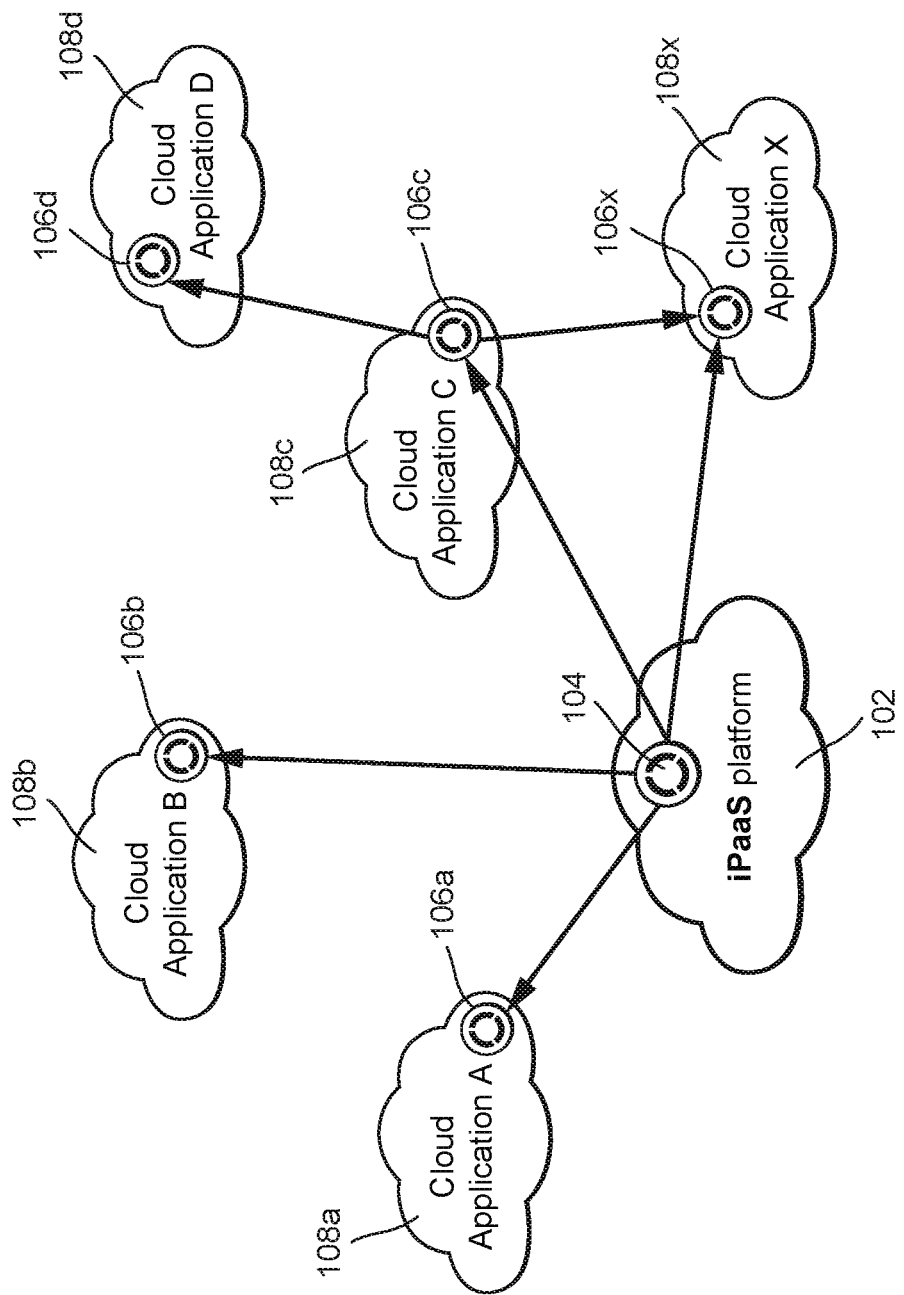
FIG. 1 is a schematic view of a "hybrid integration approach" in which new application programming interfaces (APIs), as well as existing applications from the backend, are provided or otherwise made available by an orchestrating API in the cloud.
Figure 2:
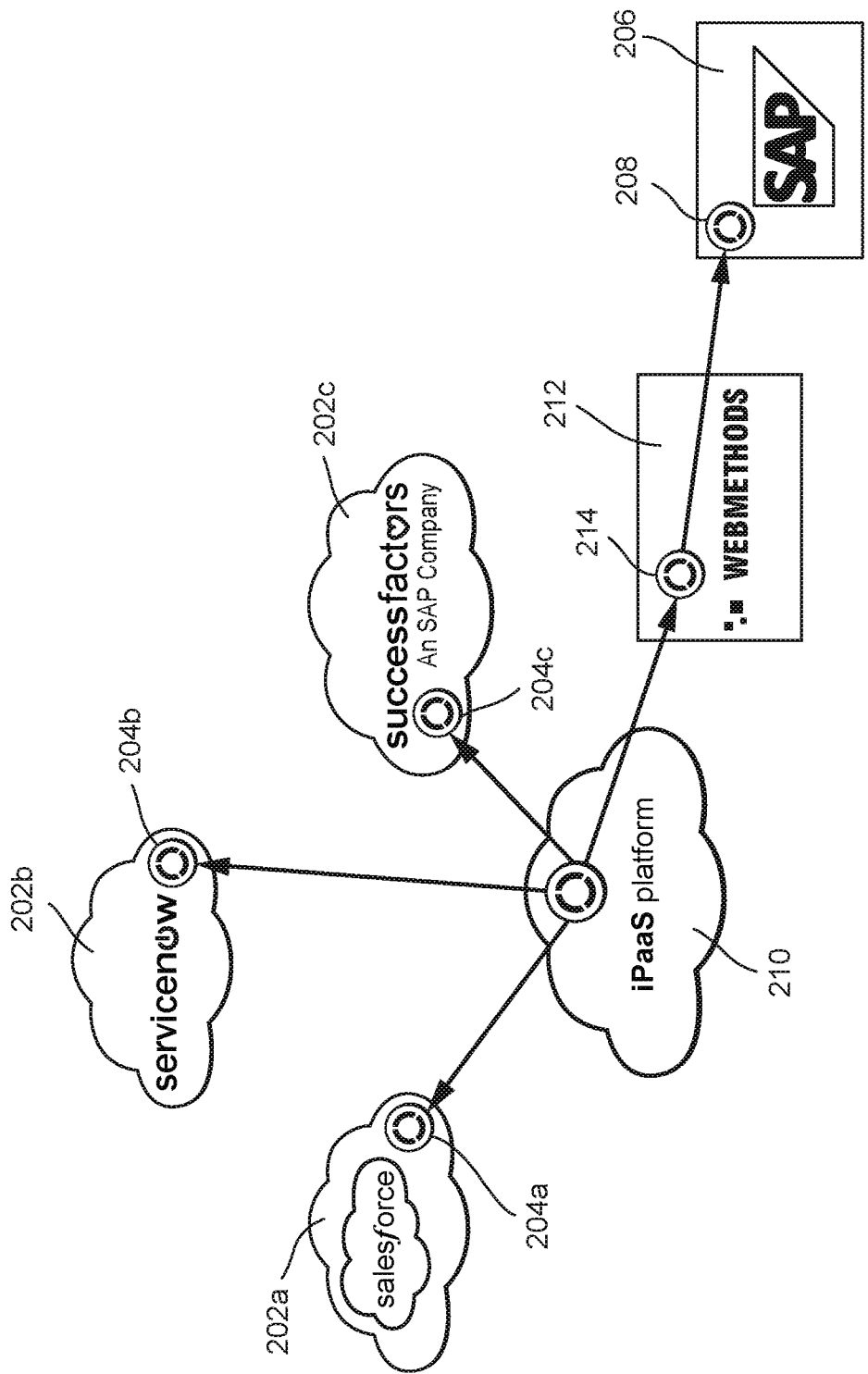
FIG. 2 is a schematic view of a cloud-to-cloud and hybrid integration in accordance with a concrete example used to demonstrate certain features of certain example embodiments.

As will be appreciated from FIG. 2, this example involves invoking different APIs, respectively found in or otherwise corresponding to the Salesforce architecture cloud 202a, the service.now cloud application 202b, and an SAP system (which includes both the successfactors cloud application 202c, as well as the SAP on-premises non-cloud backend application 206). It is assumed for the purposes of this example that it is possible to manage all of one's accounts, opportunities, etc., as well as one's devices, terminals, etc., using the Salesforce architecture cloud 202a and its associated API 204a. In the event of a device failure, a "Case" will be opened up in the Salesforce architecture cloud 202a via its associated API 204a. With the help of a mobile app, consumers can directly enter problems. A new "Ticket" will be created in another cloud application, namely, the service.now cloud application 202b via its associated API 204b. In this example, it is assumed that this provider offers more sophisticated tools for incident management.

The "real" or actionable billable order is created in the enterprise resource planning or ERP system (which, for the purposes of this example, is an SAP system that includes both the successfactors cloud application 202c and the SAP backend application 206, as indicated above), so that a certified engineer is sent to the location of the machine that needs to be fixed. The SAP system in this example performs three actions, namely, a check warranty action (e.g., using the SAP backend application 206 and its associated API 208), an identification of the employee/engineer assigned to address the Ticket based on searching for certain qualification criteria (e.g., using the successfactors cloud application 202c and its associated API 204c), and the creation of a service order in the ERP system and its assignment to the selected employee/engineer (e.g., using the SAP backend application 206 and the successfactors cloud application 202c, as well as their associated APIs 208 and 204c).

This example also involves an iPaaS platform 210 in its own cloud that helps orchestrate the API calls (which may involve application within other clouds, on-premises non-cloud backend applications, etc.). In this case, the webMethods Integration Cloud from Software AG is selected as the iPaaS solution, and the iPaaS platform 210 communications with the SAP backend application 206 via a webMethods on-premises backend application 212 and its associated API 214. As will be appreciated, one or more backend applications may be a part of the overall platform and be exposed through APIs or the like, in manners similar to cloud applications.

As will be appreciated form the description above, the main actions described above are triggered by invoking a publically available API of the vendor. The following table lists typical actions that could be calculated as meaningful "inverse" actions for the above-described (and below-summarized) API calls:

| API Call | Calculated Inverse API Call | Inverse API Call Description |
|---|---|---|
| Create Case (Salesforce) | Query Case Query Task (both Salesforce) | Check whether the creation of a Case leads to immediate creation of a Task |
| Create Incident (service.now) | Query Incident Status (service.now) | Check whether incident has been created and correct status has been assigned |
| Search employee | — | — |
| Create Service Order (SAP) | Query Service Order State (SAP) | Check warranty and whether the service order will be immediately processed |

As will be appreciated from this example, the invocation of an inverse API call usually makes the most sense in combination with an API creating and/or updating data, inasmuch as the inverse API call is usually made to analyze the outcome of the operation. It follows that API calls that merely query data typically are of a lesser interest because they are not modifying data, although this is not always the case and inverse API calls can specified for a broad range of different operations.

Figure 3:
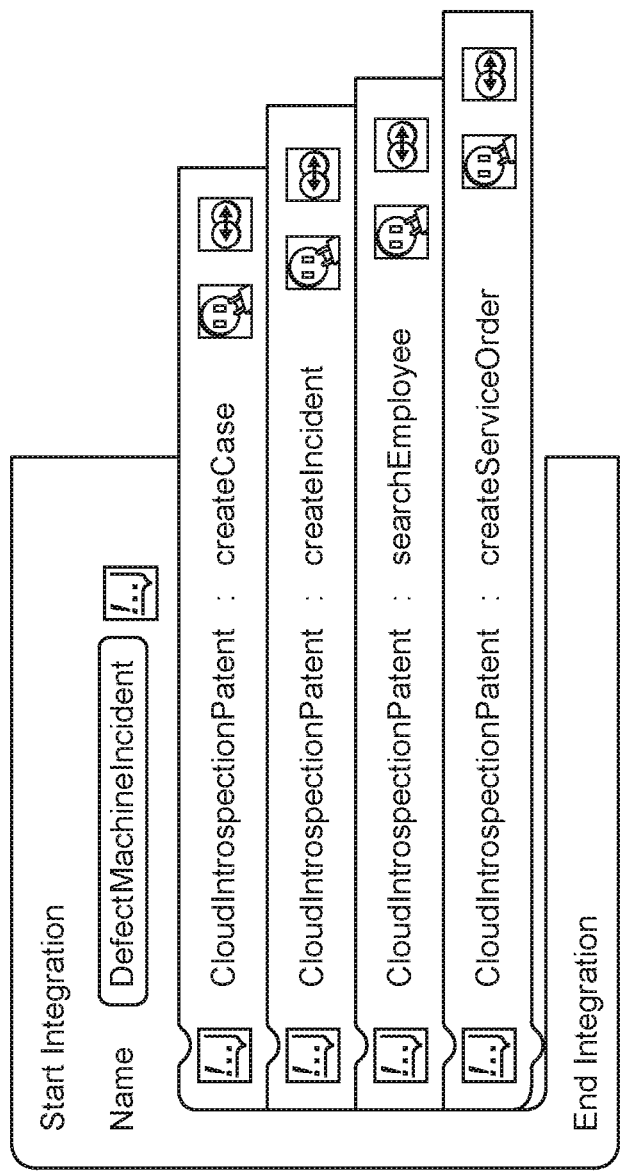
FIG. 3 schematically represents an example cloud-to-on-premises integration corresponding to the creation of an incident for a defect machine as detailed in FIG. 2, in accordance with certain example embodiments.

FIG. 3 schematically represents an example cloud-to-on-premises integration corresponding to the creation of an incident for a defect machine as detailed in FIG. 2, in accordance with certain example embodiments. As can be seen from FIG. 3, the DefectMachineIncident integration includes createCase, createIncident, searchEmployee, and createServiceOrder operations. These operations are in essence self-defining and can be further understood from the table above.

Figure 4:
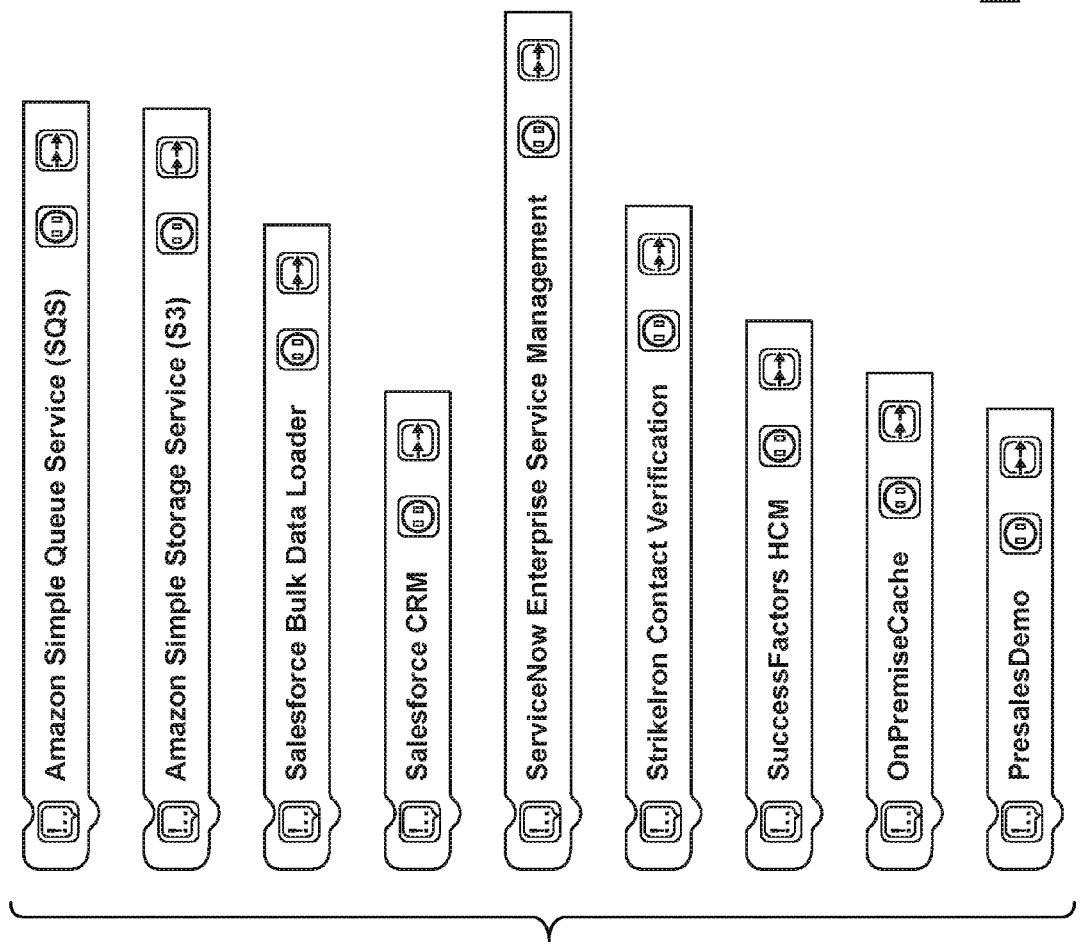
FIG. 4 identifies example cloud applications of the FIG. 3 example cloud orchestration.

Example cloud applications of the FIG. 3 example cloud orchestration are shown in FIG. 4. The example cloud applications in this example each have an application type, identifying for instance an associated the Customer Relationship Management (CRM) system, ticket management tool, and system endpoint, through which the corresponding service can be reached. That is, the application type in certain example embodiments may identify a related application and vendor.

Figure 5:
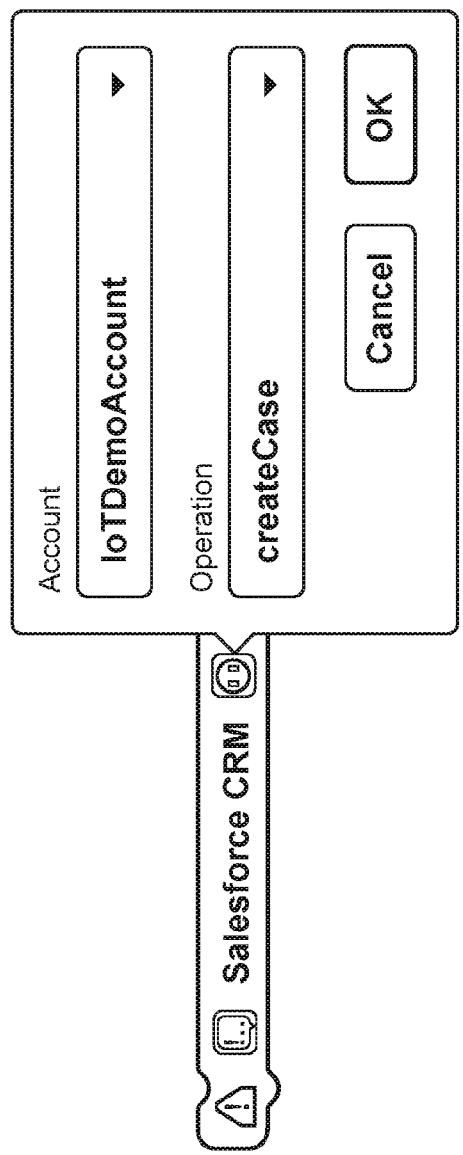
FIG. 5 demonstrates a service being selected for one of the FIG. 4 example applications.

Each application has an identified corresponding service. In the FIG. 5 example, the Salesforce CRM application has, as one example, a createCase service.

Figure 6:
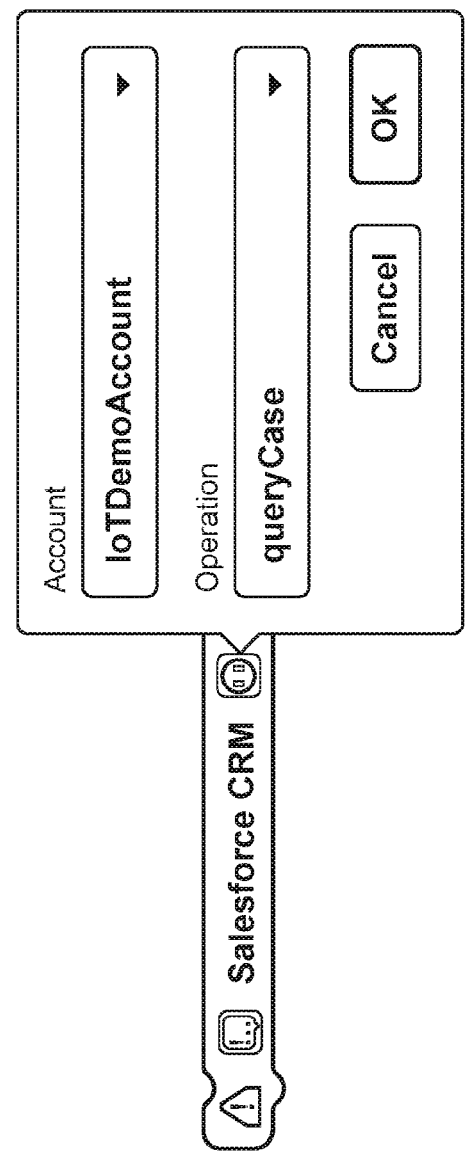
FIG. 6 demonstrates the proposal of an inverse API for the example service selected in FIG. 5.

Inverse API calls for identified services may be manually selected, or proposed and/or automatically selected in a number of different manners. With respect to the latter, for example, certain example embodiments may follow simple semantic analysis patterns such as, for example, choosing a corresponding "query" operation for every "create" or "update" operation. As shown in FIG. 6 example, the inverse API proposed for the FIG. 5 createCase service is the queryCase service.

Figure 7:
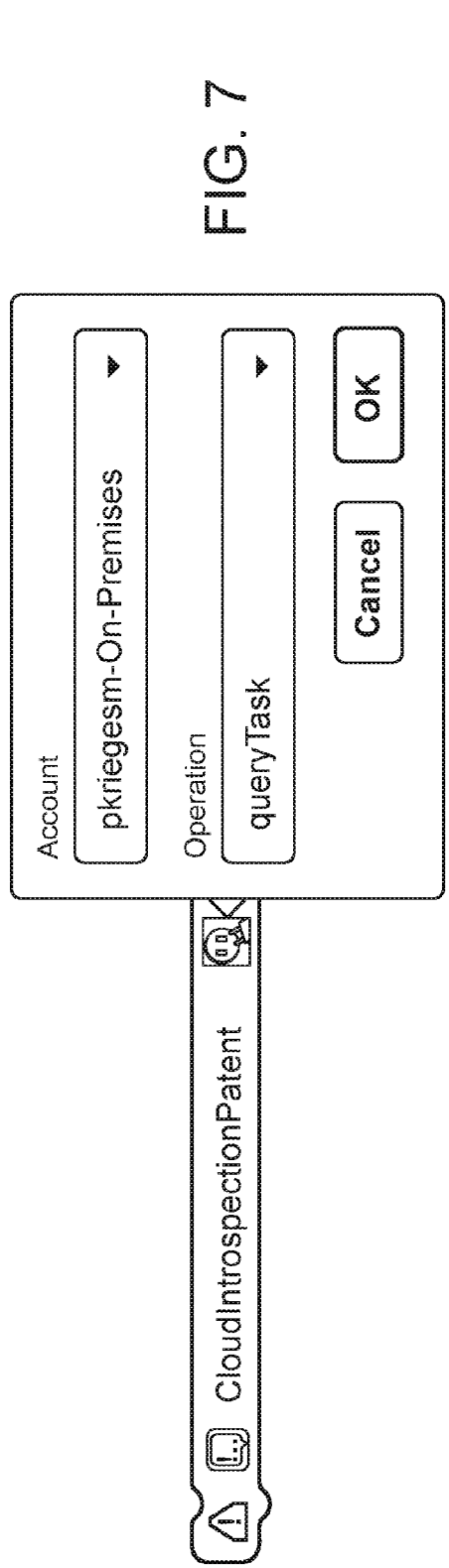
FIG. 7 demonstrates the proposal of another inverse API for the example service selected in FIG. 5, e.g., based on built-in Integration Platform as a Service (iPaaS) platform intelligence.

In this example, and as shown in FIG. 7, the inverse API selection is intelligent and additionally identifies the queryTask service, as it would be desirable to know whether a task has been immediately created as result of adding a new case.

Figure 8:
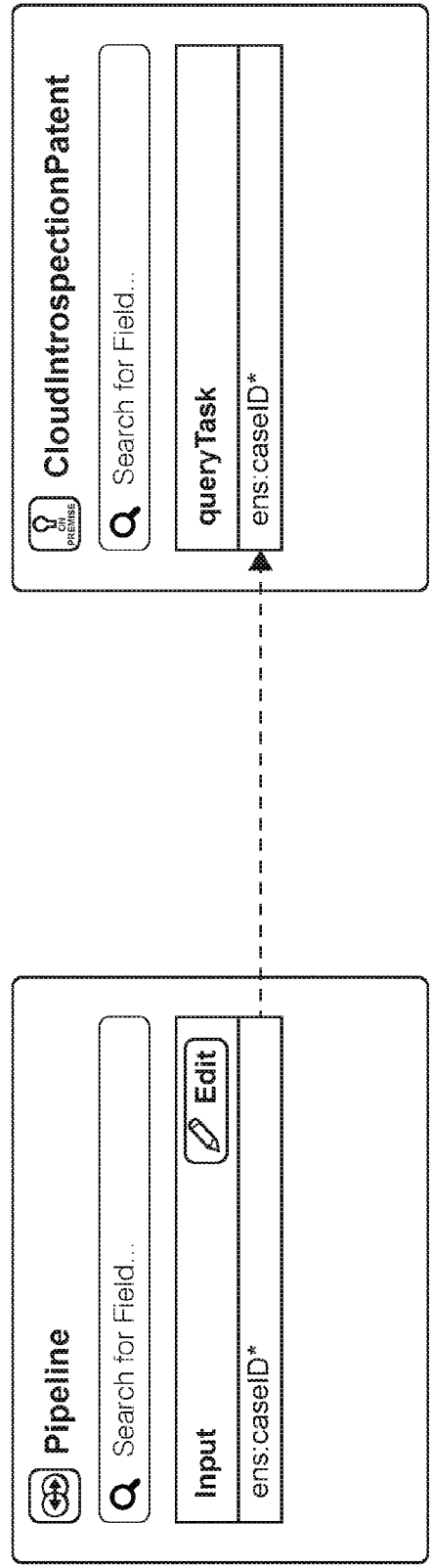
FIG. 8 demonstrates the mapping of parameters as between an API and its selected inverse API, in accordance with certain example embodiments.

In order to properly invoke the inverse API, the search parameters (e.g., parameters of the corresponding operation) may be mapped manually, automatically computed using intelligent mapping functional (e.g., provided by the iPaaS platform), and/or the like. In this example, the mapping is simple, as the case ID (an output field of the createCase operation) can be directly mapped into the input of the queryTask operation, e.g., as shown in FIG. 8. An inverse API call may be treated as a stateless action, e.g., with its output (potentially even for more complex orchestrations) being the sum of stateless API call results. Input parameters for inverse/corresponding API calls may be identified in manners similar to the inverse API selection procedure. This includes, for example, manual mapping (e.g., where the user manually specifies constant values or output fields from the invoked selected API in order to be able to invoke the inverse API), registry-based selection (e.g., based on a static list of APIs and field mappings, for example, if iPaaS providers or others maintain a list of typical API/inverse API pairs and also their mappings), algorithm-based selection (e.g., based on field mappings or best fit input values that are computed by algorithms, which are fed by metadata and/or annotations such that, for example, if the selected API returns the ID of a created customer, the inverse API that will query additional information about the customer is fed by the dynamically created customer ID), social intelligence based selection (e.g., where inverse API input field mappings are based on the typing settings of other users), context-based selection, and/or the like. Context-based selection may provide an advanced and dynamic option through which an inverse API input field mapping is determined from additional metadata or the like, such as via ontologies or taxonomies, that describes the intention and/or purpose of the currently defined API orchestration. These approaches are combinable with one another. For instance, the context-based selection approach can be combined with the other approaches, e.g., as demonstrated via the following example: An API call ("Person is created is criminal suspect database") is classified as being relevant for public places like harbors, airports, and stations. The algorithm-based selection provides the mapping for person output ID to input parameters of public service APIs. Depending on the classification, the context, and the availability of additional attributes (e.g., address data is known), it is possible to compute additional query parameter, e.g., geo-information ("all stations/airports in radius of 200 km"), and the final "inverse API call" will be made using an API from public authorities, querying whether this person has been added to the watch lists of public places in the radius of 200 km.

When a user is debugging an integration solution, the current pipeline may be displayed, together with the output of the inverse API invocation calls. This is possible in certain example embodiments because the manually selected or automatically derived inverse API invocation chain may be invoked in parallel when the solution is debugged, with the results being made visual in real-time. The main API calls, and/or associated parameters, may be retrieved because the iPaaS platform itself is running the orchestration. As will be appreciated by those skilled in the art, the pipeline in certain example embodiments refers to the operations being called sequentially, e.g., since debugging in certain example embodiments refers to stepping through the real integration logic. There might be a similar pipeline displayed, e.g., displaying the results of the inverse or corresponding API calls.

Based on the description above, it will be appreciated that inverse API call selection and/or parameter mapping may be performed in accordance with any suitable technique. For example, inverse API call selection and/or parameter mapping may be offered through different selection types that may be performed individually and/or in combination. As explained in greater detail below, this may include one or more techniques selected from along the spectrum of completely manual selection and/or mapping, to completely automatic selection and/or mapping (e.g., through the application of predefined rules such as semantic analysis). The approaches may be blended, e.g., such that automated selections and/or mappings are presented for manual individual or social group confirmation, individual manual selections and/or mappings are presented for social confirmation, etc.

It will be appreciated that if the debugging process includes a sequence of chained API calls, the output from the inverse API calls may be aggregated accordingly. That is, a side-by-side comparison of the chained API calls may be treated as a group, as may be the output from the inverse API calls. This may be accomplished by in essence buffering or at least temporarily storing the results from the inverse API calls so that they can be aggregated and presented, accordingly. In other cases, interim results from the inverse API calls may be displayed (e.g., with indicia that results from the chained API calls and/or inverse API calls are pending or "to be completed") and updated once the chained API calls and/or inverse API calls have finished executing.

Similarly, although certain example embodiments are described in connection with inverse query API calls related to creation and modification operations, the example techniques described herein are not restricted to one-to-one API or operation mappings. In this regard, a creation or modification operation may have multiple querying operations assigned. For instance, an API orchestration including five API calls ultimately may have seven inverse API calls. There might be other cases where an API orchestration including 10 API calls will have only two inverse API calls assigned. The example embodiments described herein are able to handle these different, non-one-to-one scenarios.

Figure 9:
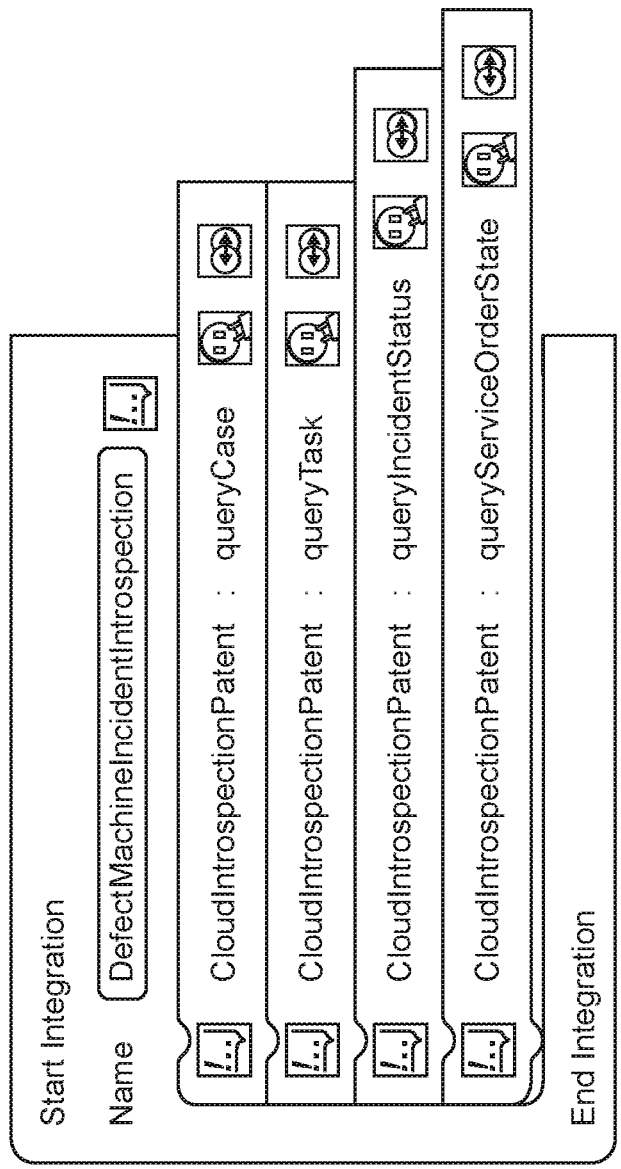
FIG. 9 schematically represents the inverse API invocation for the FIG. 3 example integration.

FIG. 9 schematically represents the inverse API invocation for the FIG. 3 example integration. The inverse API invocation in this example includes queryCase, queryTask, queryIncidentStatus, and query ServiceOrderState operations.

The remote application introspection that becomes possible using this example integration assumes a synchronous communication pattern, and that the response of inverse API calls will be made available within a short timeframe (e.g., within seconds or milliseconds, in some instances). Modifications may be made in the event that an inverse API call results in an asynchronous notification, e.g., in the sense that that notification may need to be correlated to an already completed debug run or the like. In such instances, modifications may be made to tag or otherwise identify inverse API calls (and their associated operations) so that results may be tracked and correlated and, if necessary, so that operations may be re-run in the case of asynchronous results that might have downstream effects on other inverse API calls or operations. In a perhaps related vein, modifications may be made to accommodate the concept of automated tasks, where one operation triggers another operation, performing any kind of action (e.g., a creation or modification action triggering a query operation, or vice versa).

It will be appreciated from the description above that these techniques are non-invasive. That is, the inverse API calls in this example require neither the modification of the remote system, nor the installation of agents thereon. Instead, as will be appreciated from the description above, the iPaaS platform in essence establishes API contracts between integration consumers and API providers. API contracts may specify details of a stable interface (e.g., input, output data), availability (e.g., downtimes, 24×7 readiness, etc.), and/or the like. API contracts typically also specify security methods and logging/auditing service levels (e.g., keep track of all client communications and data for at least the last 90 days, etc.). In some mature markets, contracts may also incorporate monetary aspects (pay per use). In addition, or as an alternative, the availability of external APIs and versions may be kept up-to-date, e.g., by proactively querying the API vendors to check for new versions, deprecated APIs, completely new APIs, updated inputs and/or outputs, etc. In this regard, dedicated metadata APIs of the respective vendors may be queried.

Figure 10:
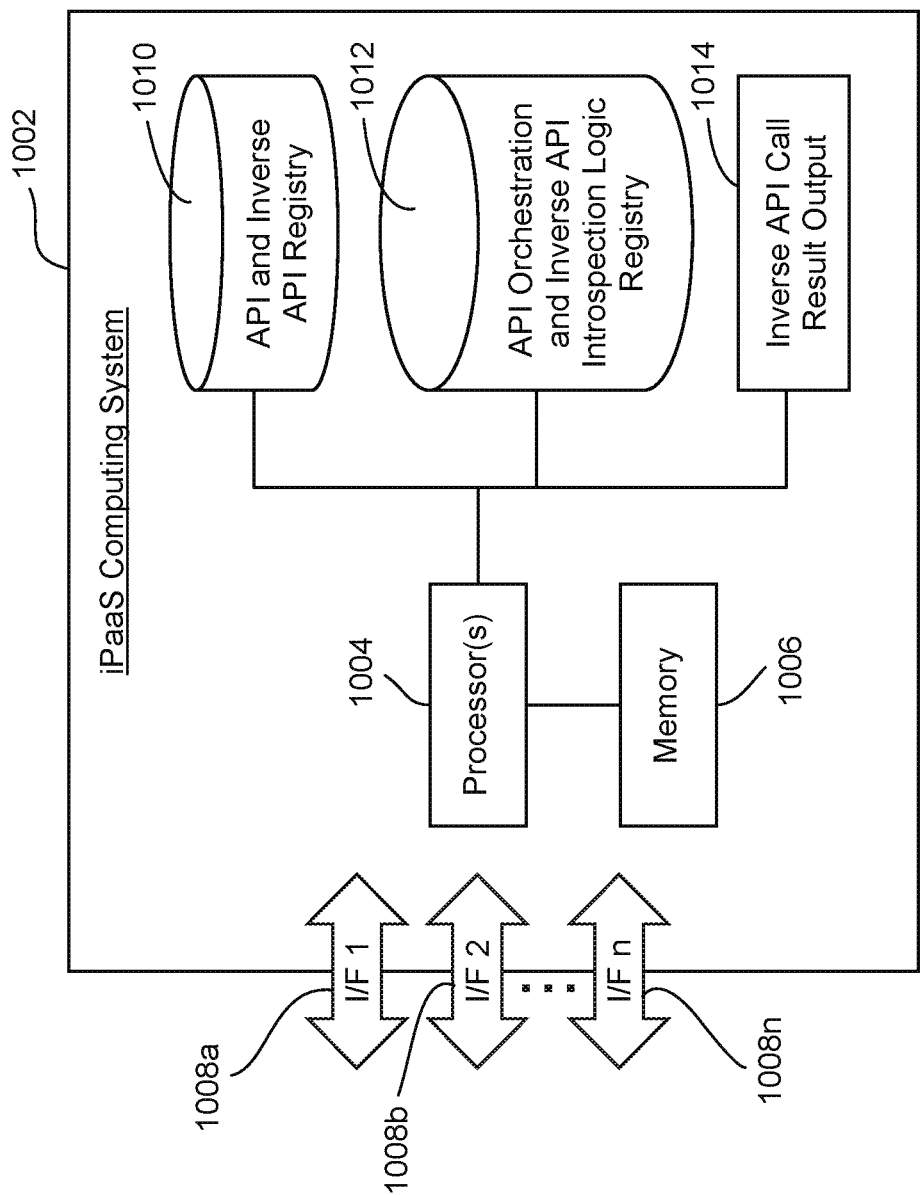
FIG. 10 is a block diagram showing components of an example iPaaS computing system that may be used in connection with certain example embodiments.
Figure 11:
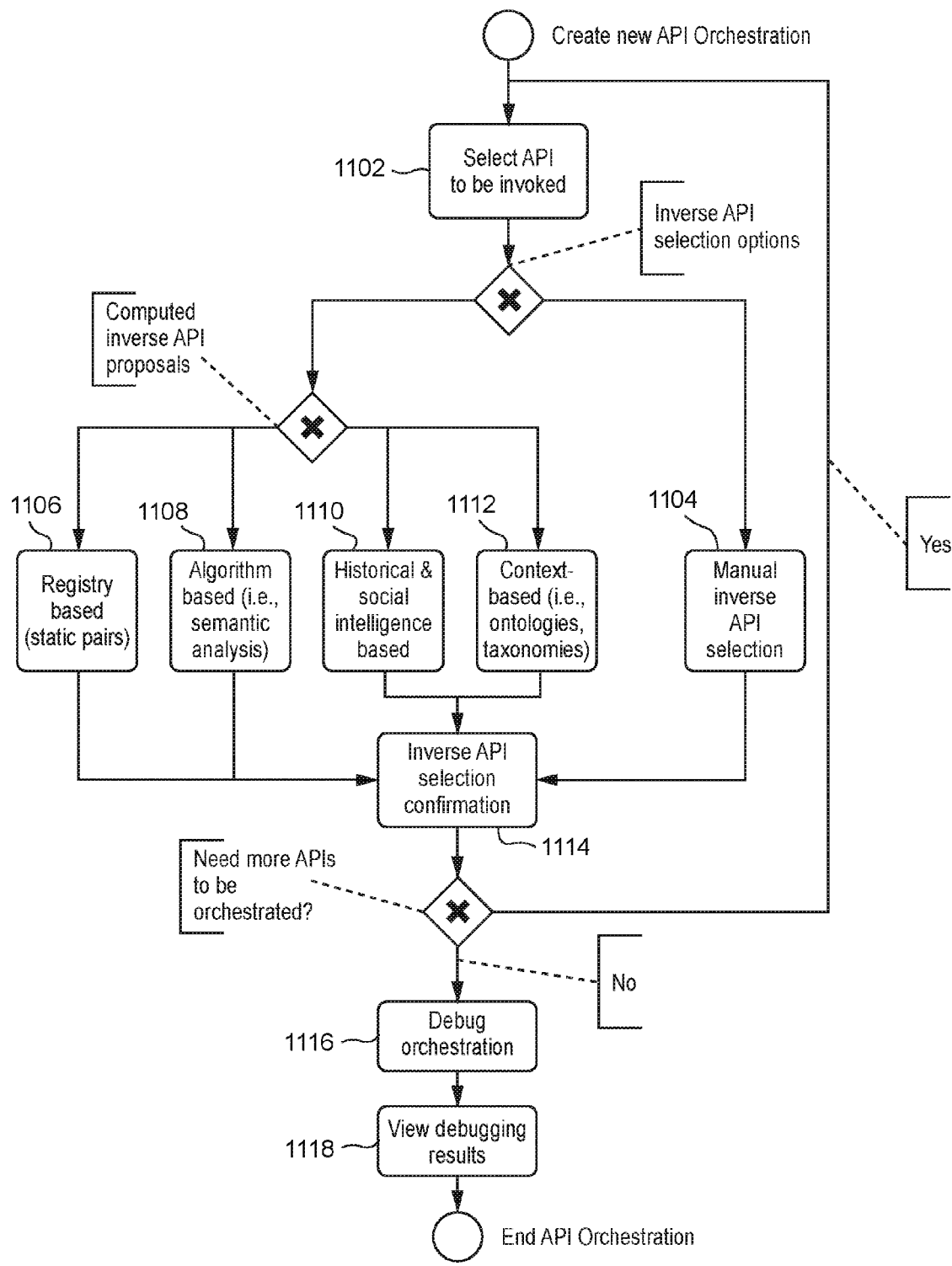
FIG. 11 is a flowchart showing how non-invasive remote application introspection can be implemented within an iPaaS computing system in connection with certain example embodiments.
Figure 12:
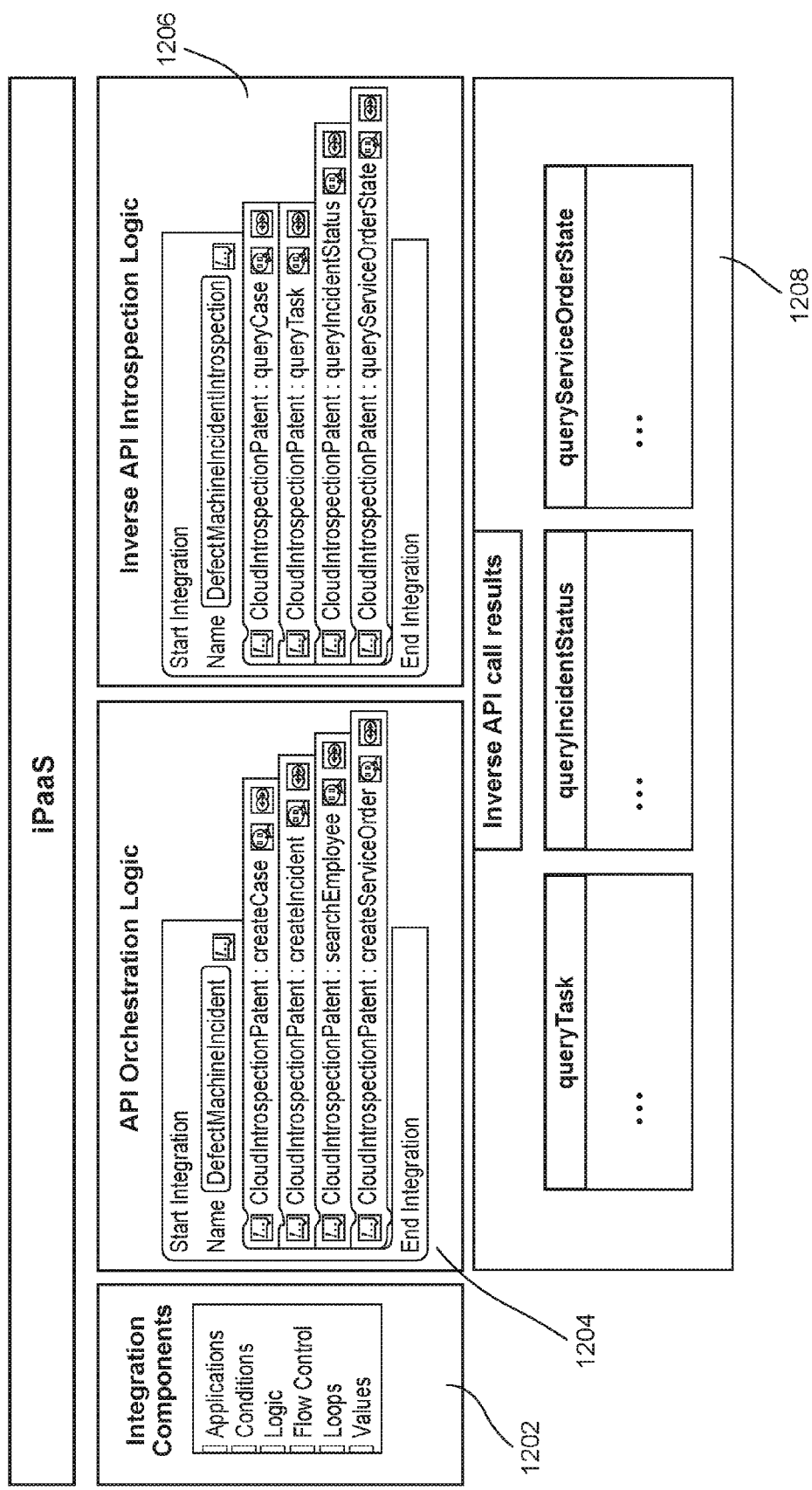
FIG. 12 is an example remote application introspection frontend view, in accordance with certain example embodiments.

An example implementation will now be provided in connection with FIGS. 10-12. It will be appreciated that this description is provided by way of example and without limitation. For example, FIG. 10 is a block diagram showing components of an example iPaaS computing system that may be used in connection with certain example embodiments. The example iPaaS computing system 1002 shown in FIG. 10 exists in a cloud or other distributed computing environment and includes processing resources such as, for example, one or more processors 1004 and a memory 1006. As alluded to above (e.g., in connection with FIG. 2), the iPaaS computing system 1002 is connected to external systems via a series of interfaces 1008a-1008n. These external systems may be other cloud providers that provide connections through their respective APIs or other interfaces, backend non-cloud-based systems that provide connections through their respective APIs or other interfaces, etc.

One or more non-transitory computer readable storage mediums back several registries or other data stores. For instance, as shown in the FIG. 10 example system, a first registry 1010 links together API operations and inverse API operations, and a second registry 1012 links together API orchestration logic and inverse API introspection logic. These registries may also store other data that maps corresponding parameters as between the API calls and their inverse calls, version information for the various APIs, logic creation information (e.g., versions, creation dates, authors, etc.), and/or the like. Although these elements are shown in different storage locations in the FIG. 10 example, one or more data structures backed by non-transitory storage may be used to store the same or similar information. For instance, a single database system with multiple tables may be used in place of, or in addition to, the first and second registries 1010 and 1012. An inverse API call result output module 1014 may be used to generate for display on one or more local or remotely located display devices information about the API call results and the inverse operations, e.g., for introspection purposes. Results also may be stored to a non-transitory storage location via the module 1014, e.g., for offline or non-real-time post hoc analysis.

FIG. 11 is a flowchart showing how non-invasive remote application introspection can be implemented within an iPaaS computing system in connection with certain example embodiments. In other words, the FIG. 11 flowchart shows an example API orchestration development process that may be used in connection with an iPaaS platform or other computing system such as that shown in and described in connection with the FIG. 10 example. As shown in FIG. 11, an API to be invoked is selected in step 1102. As explained above, options for the selected API may be specified in a number of different ways. Manual inverse API selection may be used, e.g., as represented in step 1104. Alternatively, automatically computed inverse API proposals may be presented to the user. This may take place by any one or more of: performing a registry-based selection indicative of static pairs (step 1106); analyzing the selected API with an algorithm that uses, for example, semantic or other analysis, as outlined above (step 1108); referring to historical and/or social based intelligence (step 1110) to see what others have done in the past and/or suggest for this instance; referring to context-based intelligence such as, for example, one or more predefined ontologies, taxonomies, or the like (step 1112); etc. Users may be given the option to perform any one or more of these automatic computation techniques to develop a listing of one or more inverse APIs applicable to the selected API. Regardless of whether manual or computed inverse API selection is used, manual confirmation as to the inverse API selection may be desired, e.g., as indicated in step 1114.

In one or more steps not shown, parameters of the selected API may be mapped to corresponding parameters of the corresponding inverse API. For instance, output from the selected API may be mapped to input of the corresponding inverse API, etc.

If there are more APIs to be added to the orchestration, then the process loops back to step 1102. Otherwise, the orchestration may be debugged or otherwise introspected as indicated in step 1116, and the results of the debugging or other introspection may be viewed in step 1118.

In certain example embodiments, inverse operations may be defined as an integration or orchestration is being defined. In certain example embodiments, a predefined integration or orchestration may be read and, in this case, operations may be identified (e.g., from a file including a representation of same). Those identified operations may be presented for a user, thereby enabling the user to create inverse API introspection logic and/or identify which operations should have inverse API operations defined as a part of the inverse API introspection logic. For instance, a user may be presented with a listing of operations included in the main integration or orchestration, and then may be able to manually specify inverse operations, and/or confirm automatically calculated inverses, etc., e.g., as described herein.

In order to execute the FIG. 11 example process, an application may be used. This application may be a dedicated backend application in communication with the iPaaS computing environment, a cloud- or other network-enabled application running in the iPaaS computing environment, and/or the like. In other words, the solution of certain example embodiments may run within a web browser, as a "fat client" application, and/or the like. In this regard, FIG. 12 is an example remote application introspection frontend view, in accordance with certain example embodiments.

As shown in FIG. 12, a developer can define an API orchestration by making selections from a palette of actions corresponding to the integration components list 1202, and arranging such selections within the design panel 1204 that defines the overall API orchestration logic. In the FIG. 12 example, the integration components list 1202 includes applications, conditions, logic elements, flow control elements, loops, and values. In certain example embodiments, the integration components list 1202 may include available APIs (e.g., APIs registered with the iPaaS platform) that can be selected for building an integration solution. Once a specific API is selected, integration components of it may be made available for selection and arrangement within the design panel 1204.

The inverse API calls are either manually or automatically derived from the actual context, at least for the elements included in the design panel 1204. The inverse API calls are arranged within the inverse API introspection logic panel 1206. The FIG. 12 example shows orchestration logic corresponding to the FIG. 3 example, and an inverse API introspection orchestration corresponding to the FIG. 9 example. Thus, the inverse API introspection logic panel 1206 is shown as the mirrored result of the orchestration specified in the design panel 1204.

For instance, imagine debugging an API that creates a person record in another system. In the context of creating a new customer in an online shop, one might want to know whether a customer number has been assigned and therefore a "query customer number" inverse API call is offered. In another context, e.g., adding a criminal suspect to a policy database, one might want to query all airport databases in order to double-check whether that person has been successfully added to a blacklist of people, not being allowed to leave the country.

With respect to inverse API operation selection, for every application operation that modifies data (e.g., insert, update, and/or other operations), the user may be asked to either manually select, and/or choose from a list of computed proposals, the inverse query operation. The inverse API selection dialog can be implemented as pop-up screen with search facilities for manual selections, checkboxes for selecting or approving computed proposals, etc. Typical options how inverse API calls are selected include: manual selection, e.g., where integration developers or others manually select the corresponding inverse API and also define the mapping of input fields; registry-based selection from a static list of APIs and field mappings (including for example a list of typical API/inverse API pairs), e.g., maintained by iPaaS providers and/or others; algorithm-based selection, where inverse APIs and mappings are calculated based on semantic or other analysis (e.g., "query case" operations can be derived from "create case" or "update case" operation names), potentially in a highly dynamic and possibly up to real-time manner in which the invocation of vendor APIs itself automatically fetches or computes the potential list of inverse APIs; social intelligence based selection, where inverse API suggestions are based on the historical selection or recommendations of other developers or previous orchestrations; context-based selection, which may be implemented as an advanced and dynamic option in which an inverse API is determined from additional metadata such as, for example, ontologies or taxonomies, that describe the intention and purpose of the currently defined API orchestration; and/or the like. As indicated above, these approaches may be used alone and/or together in any suitable combination, sub-combination, or combination of sub-combinations. In one advanced development level, the inverse API selection process may be so smart that all inverse APIs are automatically chosen for the currently active developer and orchestration.

It will be appreciated that in certain example embodiments the inverse APIs included in the inverse API introspection logic panel 1206 are public APIs provided by remote systems or vendors. As such, they do not require the installation of (remote) agents, at least according to certain example embodiments. In certain example embodiments, the only thing to be agreed on between (inverse) API consumer and provider is an API contract, clearly defining the SLAs between the two parties, as well as the way in which the APIs and their versions can be looked up.

Integration mapping logic can be reused within the iPaaS platform in order to map the output of a modifying operation to the input of the inverse query operation.

When the user is debugging a sequence of API calls, the inverse API calls in certain example embodiments are executed in parallel. The results of those (potentially aggregated) query operations may be visualized in the inverse API call results panel 1208. As can be seen from the FIG. 12 example, each of the calls included in the inverse API introspection logic panel 1206 has a corresponding display section.

In mature iPaaS solutions, the debugging output may be used for automatically creating test beds such as, for example, test cases for automated cloud-based integration testing.

It will be appreciated that the example techniques disclosed herein advantageously support the growing acceptance of cloud and/or other distributed computing paradigms and, more particularly, the increasing number of public APIs offered by many different organizations. In a perhaps related vein, it will be appreciated that the example techniques herein may be useful in helping API orchestration developers, testers, and/or others, in debugging their solutions, checking results of test runs, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A distributed computing system, comprising:
   a plurality of first computing platforms, each said first computing platform comprising an interface and first processing resources including a first memory and at least one first processor the first processing resources of the respective first computing platforms being configured to perform operations in response to instructions received over the respective interfaces; and
   an integration and introspection computing platform comprising second processing resources including a second memory and at least one second processor, the integration and introspection computing platform being located remote from the first computing platforms, the second processing resources being configured to control the integration and introspection computing platform to at least:
     send first instructions to the first computing platforms to cause the first computing platforms to perform first operations in accordance with orchestration logic;
     send second instructions to the first computing platforms to cause the first computing platforms to perform second operations in accordance with introspection logic, the second operations being defined as inverse operations of at least some of the first operations;
     receive from the first computing platforms results from the performance of the second operations; and
     correlate the received results and the corresponding first operations,
   wherein the inverse operations are automatically determined by one or more of:
     looking up in a registry stored linkages between performable operations and their inverses,
     running an algorithm on performable operations to identify one or more inverses thereof,
     consulting historical and/or social-intelligence based information concerning linkages between performable operations and their inverses, and
     performing a context-based analysis on performable operations to identify one or more inverses thereof.

2. The system of claim 1, wherein the second instructions are sendable to, and the results from the performance of the second operations are receivable from, the first computing platforms without software agents being installed on the first computing platforms.

3. The system of claim 1, wherein each interface is an application programming interface (API), and wherein the first and second instructions are API calls.

4. The system of claim 3, wherein each API is a public API.

5. The system of claim 1, wherein the distributed computing system operates in a cloud computing environment, and wherein at least some of the first computing platforms are provided by different cloud providers.

6. The system of claim 5, wherein at least one of the first computing platforms is a non-cloud system hosting an on-premises backend application.

7. The system of claim 5, wherein each interface is an application programming interface (API), and wherein the first and second instructions are API calls.

8. The system of claim 7, wherein the integration and introspection computing platform is an integration platform as a service (iPaaS) computing platform.

9. The system of claim 7, wherein the second processing resources are further configured to control the integration and introspection computing platform to at least aggregate the received results for chained API calls.

10. The system of claim 1, wherein the second processing resources are further configured to control the integration and introspection computing platform to at least cause the first operations, and their corresponding inverse operations, if any, to be performed in parallel with one another.

11. The system of claim 10, wherein each second operation has exactly one corresponding first operation.

12. The system of claim 10, wherein at least one first operation has more than one corresponding inverse operation.

13. The system of claim 1, wherein the second processing resources are further configured to control the integration and introspection computing platform to at least generate for output to a display device a display including the received results and the corresponding first operations.

14. The system of claim 13, wherein the display is updatable in real-time, as first and second operations are performed.

15. A method of debugging and/or introspecting an integration deployed in a distributed computing environment, the integration being defined to include a plurality of operations performable responsive to receipt of instructions from an orchestrating system by public interfaces of computing systems of the distributed computing environment, the orchestrating system being located remote from the computing systems, the method comprising:
identifying an inverse operation for at least some of the performable operations in the integration, the inverse operations also being performable responsive to receipt of instructions from the orchestrating system by the public interfaces of the computing systems of the distributed computing environment, each inverse operation being structured to reveal, upon its performance, an effect of one or more associated performable operations; and
enabling the orchestrating system to send instructions to the public interfaces of the computing systems to cause the performable operations and their associated inverse operations, if any, to be performed in parallel with one another via processing resources of the computing systems, in debugging and/or introspecting the integration,
wherein the identification of inverse operations is performed automatically and includes one or more of:
looking up in a registry stored linkages between performable operations and their inverses,
running an algorithm on performable operations to identify one or more inverses thereof,
consulting historical and/or social-intelligence based information concerning linkages between performable operations and their inverses, and
performing a context-based analysis on performable operations to identify one or more inverses thereof.

16. The method of claim 15, wherein the identification of inverse operations is performed manually.

17. The method of claim 15, wherein the identification of inverse operations is automatic, with manual confirmation.

18. The method of claim 15, wherein the identification of inverse operations is performed automatically and includes running an algorithm on performable operations to identify one or more inverses thereof, the algorithm including semantic analysis of the names of the performable operations.

19. The method of claim 15, wherein the algorithm associates create and update type performable operations with get type inverse operations.

20. The method of claim 15, wherein the identification of inverse operations is performed automatically and includes performing a context-based analysis on performable operations to identify one or more inverses thereof using an ontology and/or taxonomy.

21. The method of claim 15, wherein the orchestrating system is configured to (a) send instructions to the public interfaces of the computing systems to cause the performable operations and their associated inverse operations, if any, to be performed and (b) receive results from the performance of the inverse operations, without software agents being installed on the computing systems.

22. The method of claim 15, wherein each public interface is an application programming interface (API), and wherein the first and second instructions are API calls.

23. The method of claim 22, wherein the distributed computing environment is a cloud computing environment, and wherein at least some of the computing systems are provided by different cloud providers.

24. The method of claim 23, wherein the orchestration system is an integration platform as a service (iPaaS) computing platform.

25. The method of claim 15, wherein each inverse operation has exactly one corresponding performable operation.

26. The method of claim 15, further comprising generating for output to a display device a display including output from the inverse operations, along with an identification of their corresponding performable operations.

27. The method of claim 26, further comprising updating the display as the inverse operations, and their corresponding performable operations, are performed.

28. A non-transitory computer readable storage medium tangibly storing a program comprising instructions that, when executed by a computer having a hardware processor and a memory operably coupled thereto, perform functionality corresponding to claim 15.

29. An orchestrating system for debugging and/or introspecting an integration deployed in a distributed computing environment, the integration being defined to include a plurality of operations performable responsive to receipt of instructions from the orchestrating system by public interfaces of computing systems of the distributed computing environment, the orchestrating system being located remote from the computing systems, the orchestrating system comprising:

processing resources including at least one processor and a memory, the processing resources being configured to control the orchestrating system to at least:
control the computing systems to perform the integration;
facilitate identification of an inverse operation for at least some of the performable operations in the integration, the inverse operations also being performable responsive to receipt of instructions from the orchestrating system by the public interfaces of the computing systems of the distributed computing environment, each inverse operation being structured to reveal, upon its performance, an effect of one or more associated performable operations; and
(a) send instructions to the public interfaces of the computing systems to cause the performable operations and their associated inverse operations, if any, to be performed in parallel with one another via processing resources of the computing systems, and
(b) receive results from the performance of the inverse operations from the public interfaces of the computing systems, in debugging and/or introspecting the integration,
wherein the identification of inverse operations is performed automatically and includes one or more of:
looking up in a registry stored linkages between performable operations and their inverses,
running an algorithm on performable operations to identify one or more inverses thereof,
consulting historical and/or social-intelligence based information concerning linkages between performable operations and their inverses, and
performing a context-based analysis on performable operations to identify one or more inverses thereof.

30. The system of claim 29, wherein (a) and (b) are performable without software agents being installed on the computing systems.

31. The system of claim 29, wherein each public interface is an application programming interface (API), and wherein the first and second instructions are API calls.

32. The system of claim 31, wherein the distributed computing environment is a cloud computing environment, and wherein at least some of the computing systems are provided by different cloud providers.

* * * * *